United States Patent [19]

Magiros

[11] 3,899,294
[45] Aug. 12, 1975

[54] METHOD FOR AUTOMATIC FEED FORWARD CONTROL OF EFFLUENT pH

[75] Inventor: Peter G. Magiros, Houston, Tex.

[73] Assignee: Olin Corporation, New Haven, Conn.

[22] Filed: July 18, 1974

[21] Appl. No.: 488,620

[52] U.S. Cl. ............................. 23/230 A; 23/253 A
[51] Int. Cl.² .................. G05B 13/02; G05D 21/02
[58] Field of Search .......... 23/230 R, 230 A, 253 R, 23/253 A; 324/30 R; 204/195 T

[56] References Cited
UNITED STATES PATENTS
3,791,793  2/1974  Friedmann et al. ............... 23/253 A OTHER PUBLICATIONS
Shinskey, F. G., Process Control Systems, McGraw–Hill, 1967, pp. 280–281.

Shinskey, F. G., "Feedforward Control of pH," Instrumentation Technology, June 1968, pp. 65–69.

Shinskey et al., "Adaptive Feedback Applied to Feedforward pH Control," 1970, Phila. ISA Conf., Preprint pp. 565–570.

Wilson, H. S. et al., ISA Preprint 11, 1–2–64, 10/12/64.

Primary Examiner—R. E. Serwin
Attorney, Agent, or Firm—Robert L. Andersen

[57] ABSTRACT

An indirect method for automatically controlling pH of an effluent stream is provided utilizing a feedforward method of control wherein flow rate information gathered from an upstream titration of effluent with a rapidly reacting neutralizing agent is utilized to control the flow of a stream of neutralizing agent into the effluent stream at a point downstream.

10 Claims, 1 Drawing Figure

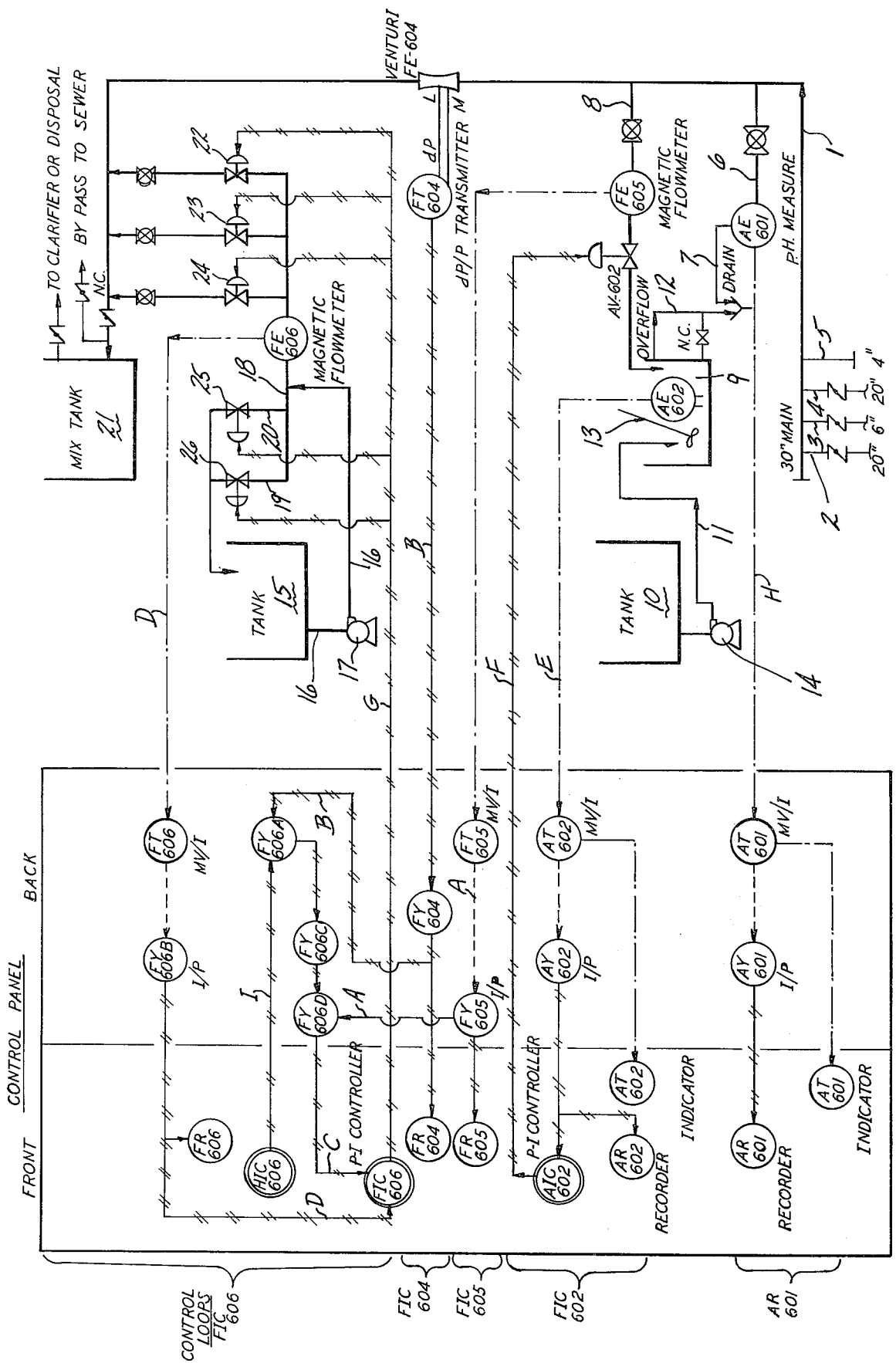

METHOD FOR AUTOMATIC FEED FORWARD CONTROL OF EFFLUENT PH

BACKGROUND OF THE INVENTION

The present invention is directed to a method for indirectly controlling the outfall pH of an effluent stream which may vary from moment to moment in volume, composition, buffering capacity, temperature, viscosity and in any number of other factors. More particularly the invention relates to a method for automatically controlling the flow of a neutralizing agent utilizing flow rate information gathered from an upstream titration of the effluent with a rapidly reacting neutralizing agent. The present invention is of particular utility where the volume of effluent is too high to permit storage for a period of time sufficient to permit completion of the neutralization.

Numerous methods for automatically controlling the pH of effluents have been reported in the literature. For example, feed forward systems have been employed wherein a pH and volume measurement is taken upstream, the pH compared with a set point on a controller with proportional and integral response. The controller calculates the amount of neutralizing agent required then sends a signal representing the difference in the two values to a valve downstream which is opened or closed to deliver sufficient neutralizing agent to compensate for the variance in pH value.

Simple feedback systems have also been employed where the pH of a reactor effluent is compared to a set point on a controller and a signal is fed from the controller back to a valve controlling the flow of reagent to the reactor.

Neither the feed-forward nor the feedback system has been satisfactory where differences in buffering capacity or large variations in flow of effluent occur. In order to overcome these difficulties, feed forward systems were combined with feedback systems to form a combined feed forward-feedback system. In such a system, pH and volume are each measured upstream and transmitted to a controller responsive to each of these values. The controller conditions the signals representing pH and volume measurements sends a signal to control the opening of valves regulating the flow of reagent at an intermediate point downstream. At a distant point downstream another pH measurement is taken, fed to a feedback controller and compared to a set point for the final effluent pH. A feedback signal representing the difference between the desired pH and the actual pH is then sent by the feedback controller to the feed-forward controller. This signal modifies that being emitted by the feed-forward controller and thus corrects for buffering capacity and other factors which had not been compensated for by the original feed-forward signal.

In transmitting the feedback signal to the feed-forward controller two methods have apparently been utilized for conditioning the latter's response thereto. In earlier systems the feedback signal was simply added to the feed forward signal. Where equal percentage valves are employed responding to linear control signals even such feed forward-feedback systems do not adequately compensate for wide variations in the effluent stream. Friedman et al., U.S. Pat. No. 3,791,793, found that the ability of such systems to adapt to changes could be improved by adding the product of the feedback signal and the feed forward signal to the feed forward signal rather than merely summing the two.

While a feed forward-feedback system is adequate in some situations, it is impractical in others as it requires the ability to store the effluent-reagent mixture for a period of time sufficient to complete the reaction prior to measuring the pH which is to act as the primary criteria for determining the final control signal. Thus, it would appear suitable only in situations where effluent volume is relatively low as in a reactor. Even in these situations it is usually adequate only where a fast reacting reagent such as caustic or HCl is employed as neutralizing agent for the stream. Where it is desired to neutralize the stream with a slow reacting agent such as lime, the extended holding time required to allow the reaction to proceed to substantial completion before measuring the pH for feedback purposes renders this solution unsatisfactory particularly where large volumes of effluent are being treated.

We have now found a method by which the above-described disadvantages may be overcome in which a feed forward control system will precisely regulate the final outfall pH of an effluent stream. The efficacy of the method hereinafter set forth is not affected by variations which occur in effluent instantaneous flow rates or in buffering capacity of the effluent. The present method may be employed equally well for large or small volumes of effluent or for controlling the pH of a feed stream to a reactor. The method is particularly suitable for systems wherein it is desired to employ a slow reacting agent such as lime to neutralize the stream without storing large volumes of liquid in reaction tanks. While the invention comprises a novel feed forward system, it may also be employed with a feedback feature such as that disclosed by Friedman et al., U.S. Pat. No. 3,791,793 if desired. Other objects and advantages will become apparent from the following description.

SUMMARY OF THE INVENTION

In accordance with the present invention, a method is hereby provided for automatically controlling the pH of effluent streams. The invention in general comprises the steps of:

a. continuously titrating a slip stream of said effluent to a pH corresponding to a selected set point on a pH controller having proportional and integral response with a titrating stream of rapidly reacting neutralizing agent, the flow of either said slip stream or said titrating stream being constant while the flow of the other is automatically regulated;

b. continuously monitoring the instantaneous flow rate of the stream whose flow rate is automatically regulated and transmitting a signal A, corresponding to the flow rate of said regulated stream;

c. continuously monitoring the instantaneous flow rate of said effluent stream and transmitting a signal B corresponding to the flow rate of said effluent stream;

d. conditioning signals A and B to automatically provide a signal C producing a variable set point on a dilution controller, said set point controlling the instantaneous flow rate of a stream of neutralizing agent to be added to said effluent stream to produce an outfall pH substantially corresponding to the pH represented by said selected set point.

In one embodiment of the invention an effluent slip stream is titrated against a titrating stream of rapidly reacting neutralizing agent by varying the flow of the slip stream and keeping the titrating stream flow constant. In a second embodiment the flow of the slip stream may be held constant and titrating stream flow varied to titrate to a desired pH.

In a first control loop a pH controller having proportional and integral response is provided which is responsive to a signal representative of the pH resulting from the titration and which produces a signal varying the opening of a valve controlling the flow of the slip stream or the flow of the titrating stream to the titration vessel to produce therein a pH corresponding to the set point on the controller.

A second control loop measures the volume of liquid required at any instant to maintain the pH at a value corresponding to the set-point. This loop translates the flow measurement to a computing relay for conditioning.

A third control loop measures the flow rate of the effluent stream and transmits this information to a computing relay for conditioning.

A fourth control loop conditions the flow rate information received, calculates the flow rate for a stream of reagent in order to neutralize the effluent stream, transmits a variable set point to a controller having proportional and integral response and controls the flow of neutralizing agent to the effluent stream.

It will become apparent that the indirect control of pH by measuring and utilizing flow rate information from a preliminary titration effectively overcomes the problems found in prior art feed forward pH control systems.

DETAILED DESCRIPTION

FIG. 1 is a schematic flow diagram showing the flow of effluent for the present invention and showing the interrelationship of the four control loops described generally above.

As seen in the drawing, main effluent line 1 is preferably a large effluent line of a diameter sufficient to handle the effluent to be treated for disposal. It may receive contaminated effluent from any number of sources as shown by lines 2–5. The combined flow from these lines may vary from moment to moment as may the flow of each individual input to the effluent stream. The composition and volume of the effluent in line 1 are thus both subject to large variations. For example, it is not uncommon for the effluent pH to vary from a low of 1 up to 5, or higher in a plant whose effluent is generally acidic. Likewise, it is not uncommon that the flow rate will vary over a range of, say 5,000 gallons per minute up to, say 25,000 gallons per minute.

In accordance with the present invention the effluent stream is preferably acidic. For example, the effluent water from an acid plant such as a phosphoric or sulfuric acid plant. The neutralizing agent employed in the aqueous titrating stream of the preferred embodiment is thus a base, preferably a highly ionized, readily soluble, rapidly reacting strong base such as potassium or sodium hydroxide. On the other hand the neutralizing agent employed in the stream ultimately added to the effluent stream may be a strong base but is preferably a less ionized, less soluble, slowly reacting base preferably lime or hydrated lime and this neutralizing agent is preferably provided as an aqueous slurry to the effluent line, at least where the neutralizing agent has limited solubility.

Where it is desired to neutralize a basic effluent stream such as a stream containing basic calcium insoluble salts, the titrating stream is a solution of rapidly reacting acid such as HCl, $HNO_3$ or acetic acid. While these agents are also the agents of choice for the final neutralizing stream, other acids such as sulfuric or HF may also be employed if desired. In neutralizing a basic stream, however, the reaction speed between the neutralizing or titrating agent and the effluent stream is governed by the reaction products in the effluent. Thus it is important to select as a titrating agent an acid which will not impede rapid neutralization of the slipstream due to formation of an insoluble material which would prevent rapid completion of the titration. For example, if a basic stream contained insoluble calcium carbonate, the use of sulfuric acid results in slow completion of the reaction.

Referring now to the drawing, the effluent flows through effluent line 1 and, after being treated, flows out for disposal or further treatment as required. Preferably the effluent is contaminated water requiring pH adjustment before it is discharged into a river, ship channel, other body of water or recycled for re-use.

Suitably, a small sample is continuously drawn off via line 6 in order to measure and record the pre-treatment pH of the effluent. A pH recording electrode AE-601 is provided in line 6 to make this measurement. Following measurement, the sample is discarded via line 7. A signal H representative of the pH measurement is received by tranducers AT-601 and AY-601 and by a corresponding indicator on a control panel. Transducers AT-601 and AY-601 preferably convert signal H from an e.m.f. or millivolt signal to a pneumatic signal which is sent to recorder AR-601. It is to be emphasized that in the present method the only purpose of loop AR-601 which has just been described is to measure and record pre-treatment effluent pH. This loop, unlike prior art pH measurement, does not function in the control scheme. It is also to be noted that the electrical signal from AE-601 is converted to a pneumatic signal. This conversion also takes place in control loops FIC-602, 605 and 606. It is understood that this conversion is a matter of choice. It is well known and therefore contemplated that the present invention may operate on an electrical signal as well as a pneumatic signal.

At a point further downstream a slip stream of effluent is continuously withdrawn from effluent line 1 via line 8 and fed to a titration vessel 9. Simultaneously, a titrating stream is fed from a storage vessel 10 via line 11 into titrating vessel 9. Titration vessel 9 is maintained at constant volume by overflow 12 and is well agitated by agitator 13 to assure a rapid and complete mix between the effluent slip stream and the neutralizing agent in the titrating stream.

As shown in the drawing titration vessel 9 is of stainless steel and has a capacity of 30 gallons. Storage vessel 10 preferably has a larger capacity, for example, 525 gallons. Pump(s) 14 are provided to control flow of titrating stream to tank 9. The volume of vessel 10 is preferably large with respect to vessel 9 so that the neutralizing agent concentration in vessel 10 remains substantially constant at a standardized value.

As has previously been mentioned, the titration of the slip stream may be conducted in one of two ways. First, the flow of the slip stream may be varied to produce a resulting solution in tank 9 having a desired pH. If this is done, the flow of the titrating stream containing known concentration of neutralizing agent from tank 10 is then held constant. Alternatively, the flow of the titrating stream to vessel 9 may be varied and the flow of slip stream held constant. In the preferred embodiment shown in the drawing, the first alternative has been adopted. The titrating stream is thus fed from tank 10 to tank 9 by positive displacement pump 14 via line 11 at a constant rate, for example 0.44 gallons per hour (GPH). This rate, however, may be varied as desired to any other constant value.

In this preferred embodiment control loop FIC-602 is responsible for controlling the pH in titration vessel 9; and it does so by regulating the flow of effluent to the titration vessel. As the titration in vessel 9 proceeds, pH probe AE-602 constantly measures the pH resulting in the vessel. This information is transmitted as a voltage potential, signal E, to transducers AT-602, AT-602 and to pH indicator AT-602. A pneumatic signal E is provided by AY-602 to controller AIC-602 and to recorder AR-602. AT-602 is an indicator on the control panel which shows the pH at any given point in time. Recorder AR-602 constantly records the pH and shows changes occuring in the pH over a period of time.

Pneumatic pH controller AIC-602, provided with proportional and integral response, receives signal E from transducer AY-602. A manual set point is provided on controller AIC-602 corresponding to the pH desired in titration vessel 9 and also to the desired final outfall pH for the effluent stream. Signal E is compared with this set point and a pneumatic signal F is generated in response to and representing the difference between the set point and signal E. Signal F is transmitted to valve AV-602 on slip stream line 8. Signal F regulates the opening of valve AV-602 and, in effect, tells it to open or close to a degree that will allow enough slip stream flow to the titration vessel to result in a pH which the operator desires. If there is no difference between the set point and the desired pH, signal F will remain unchanged and cause no change in the valve opening.

In the preferred embodiment shown in the drawing the slip stream and effluent stream are acidic and have a pH which generally ranges from about 2.5 to about 4.5. The neutralizing agent must thus be a base in order to provide a pH acceptable for disposal under most state or federal governmental standards. In order to complete the titration in vessel 9 as rapidly as possible a strong base, highly ionized in solution, which reacts with acid, preferably instantaneously, is employed. Preferably a solution of sodium hydroxide is employed, suitable a 15 to 50% solution.

It is to be emphasized that the only purpose of control loop FIC-602 is to control the pH in titration vessel 9. The pH measurement taken therein is not transmitted to a computing relay or used in the computation of neutralizing agent to be added to the main effluent line. However, by conducting a preliminary titration to a required pH, changes in buffering capacity of the effluent are automatically considered in the computation of neutralizing agent requried, eliminating the need for a feedback loop in the system. This is accomplished by tying control loop FIC-605 to control loop FIC-602 and to control loop FIC-606 as described below.

Magnetic flow meter FE-605 is connected to line 8 so that the slip stream passes through it before entering vessel 9. Meter FE-605 thus measures the rate flow of the slip stream which is required at any instant to maintain the pH in vessel 9 at the set point. A signal A representing the slip stream flow rate is sent to transducers FT-605 and FY-605. After conversion pneumatic signal A is transmitted to component FY-606D which is a pneumatic analogue computer. The flow rate information is also recorded on recorder FR-605 on the control panel.

Control loop FIC-604 is responsible for measuring and transmitting the flow rate of the main effluent stream. As contaminated water passes through line 1, it flows through venturi meter FE-604 where the pressure drop between the inlet flange and the vena contracta is related to flow rate. This pressure drop, in inches of water, is detected by transmitter FT-604 which sends out a pneumatic signal B to square root extractor FY-604. The square root extractor is necessary to recondition the signal B from flow rate squared, which is actually measured by the venturi, to flow rate. In addition, FY-604 contains a select relay which guarantees a minimum output signal of 3 p.s.i. The extractor then sends a pneumatic signal B representative of the flow rate in the effluent line, to analogue computing relay FY-606A for further conditioning in control loop FIC-606. Signal B is also transmitted to recorder FR-604 for recording.

Control loop FIC-606 is the most important and complex of the four primary control loops. As previously described it is interconnected with control loops FIC-604 and FIC-605. Its primary purpose is to receive flow rate information from these two loops and to translate this information into a signal G controlling the delivery of a neutralizing agent to the effluent stream. While this control loop may be provided with means to manually control the feed valves it is intended to operate automatically except in extremely unusual circumstances.

There are basically two types of automatic control which are provided. In one of these modes an automatic or variable set point is computed from data provided by signals A and B. In the other, the set point is provided manually on dilution controller FIC-606. In either case, flow of neutralizing agent will be regulated to the flow called for by the set point. The difference is that in the fully automatic mode the automatic set point will float freely and be automatically varied in response to signals A and B whereas the manually established set point must be reset as needed to control flow of neutralizing agent to the effluent line. It is apparent that maximum control, efficiency and economy is obtained when controlling on the automatically computed floating set point and it is this function which control loop FIC-606 is primarily designed to perform.

It will be recalled that computer relay FY-606A receives a signal B from FY-604 which is representative of the flow through the venturi FE-604 and that this signal is conditioned by a base signal corresponding to 3 p.s.i.

Station HIC-606 may also provide a signal to FY-606A. The primary purpose of this signal to FY-606A is to modify the response of the analogue computing relay for variations in the concentration of the reagent to neutralize the effluent. This added input may be operated either manually or by means of a feedback input from a distant point downstream which is not shown on the drawing. If HIC-606 is being utilized, it will transmit a pneumatic signal I to FY-606A. Signal I is representative of any change in concentration of neutralizing agent in neutralizing agent tank 15. The signal is added to signal B in order to "fine tune" the information being received from control loop FIC-604.

Assuming neutralizing agent concentration is controlled, however, HIC-606 is generally not utilized in the system. Accordingly, FY-606A transmits signal B to a second relay FY-606C for further conditioning and then to analogue computer FY-606D where the input of signal A has been provided by the flow rate information from FY-605. Based on these two signals, the analogue computer solves for the flow rate of neutralizing agent required at any point in time to produce an effluent having a desired outfall pH according to the equation $$F_x P_x = F_m/F_s (F_y \cdot P_y \cdot R)$$

where
$F$ equals the flow in gallons per minute
$P$ equals the concentration of reactant in lbs. per gallon
$R$ equals the ratio of stoichiometric equivalents of neutralizing agent to titrating agent
$m$ is the main effluent stream
$s$ is the slip stream
$x$ is the neutralizing stream
$y$ is the titrating stream The value arrived at by virtue of this computation is forwarded by FY-606D to dilution controller FIC-606 as pneumatic signal C and becomes the automatic set point corresponding to the required flow of neutralizing agent to produce an effluent pH equal to that which is provided on controller AIC-602. Controller FIC-606 compares signal C, the desired flow rate value, with signal D, the actual flow rate value, and emits signal G representing the difference between the required rate of flow and the actual rate of flow at any instant in time. Signal G, in turn, controls the opening of valves 22–26.

An aqueous body of neutralizing agent, preferably a partially ionized and slow reacting base, preferably lime, is maintained in tank 15. A stream of neutralizing agent is removed via line 16 and pump 17 to manifold 18. That portion of the stream which flows through control valves 22, 23 and/or 24 and enters the effluent line is measured by magnetic flow meter FE-606 which has a rated range of suitably 0–90 GPM. Signal D from the flow meter is translated by transducers FT-606 and FY-606B to a pneumatic signal D which is sent to controller FIC-606 where it is compared with signal C as described above.

That portion of the stream which does not enter the effluent line is recirculated to tank 15 via lines 19 and 20 through valves 25 and 26. Valves 25 and 26 and valves 22, 23 and 24 are coordinated so that as valves 22-24 are opened, valves 25 and 26 close depending on the quantity of neutralizing agent needed to achieve the desired pH.

Following addition of lime to the effluent stream, the effluent is preferably transferred to a mix tank 21 to insure adequate mixing of the lime with the effluent. Residence time in the mix tank 21 is brief, preferably equal to or slightly greater than residence time of the slip stream in vessel 9. The treated effluent may then be transferred to other treatment areas or discharged if no further treatment is required.

What is claimed is:

1. A feed forward method for automatically controlling the pH of effluent stream comprising:
   a. continuously titrating upstream a slip stream of said effluent to a pH corresponding to a selected set point on a pH controller having proportional and integral response with a titrating stream of rapidly reacting neutralizing agent, the flow of either said slip stream or said titrating stream being constant while the flow of the other is automatically regulated;
   b. continuously monitoring the instantaneous flow rate of the stream whose flow rate is automatically regulated and transmitting a signal A, corresponding to the flow rate of said regulated stream;
   c. continuously monitoring the instantaneous flow rate of said effluent stream and transmitting a signal B corresponding to the flow rate of said effluent stream;
   d. conditioning signals A and B to automatically provide a signal C producing a variable set point on a dilution controller, said set point controlling the instantaneous flow rate of a stream of neutralizing agent to be added to said effluent stream to produce an outfall pH substantially corresponding to the pH represented by said selected set point.

2. The process of claim 1 wherein pH of a mixture resulting from said titration is continuously measured, a signal E, representing said pH measurement is transmitted to said pH controller, signal E is compared with the selected set point on said pH controller and the flow of said automatically controlled stream is continuously adjusted for any difference between signal E and the selected set point.

3. The process of claim 2 wherein the flow rate of said stream of neutralizing agent is continuously monitored, a signal D representing said flow rate is transmitted to said dilution controller, signal D compared with the variable set point on said dilution controller and the flow rate of said neutralizing agent continuously modified for any difference between signal D and said variable set point.

4. The process of claim 3 wherein signal B is first modified manually or automatically by a signal representing variations occurring in concentration of said neutralizing agent.

5. The process of claim 4 wherein said variation is determined by a direct measurement of said neutralizing agent.

6. The process of claim 4 wherein said variation is determined by a measurement of outfall pH.

7. The process of claim 4 wherein said titrating stream comprises an aqueous stream of rapidly acting neutralizing agent selected from the group consisting of Potassium and Sodium Hydroxide.

8. The process of claim 7 wherein said stream of neutralizing agent is an aqueous slurry of lime.

9. The process of claim 1 wherein said titrating stream comprises an aqueous stream of rapidly acting neutralizing agent selected from the group consisting of Potassium and Sodium Hydroxide.

10. The process of claim 9 where said stream of neutralizing agent is an aqueous slurry of lime.

\* \* \* \* \*